United States Patent Office 3,071,471
Patented Jan. 1, 1963

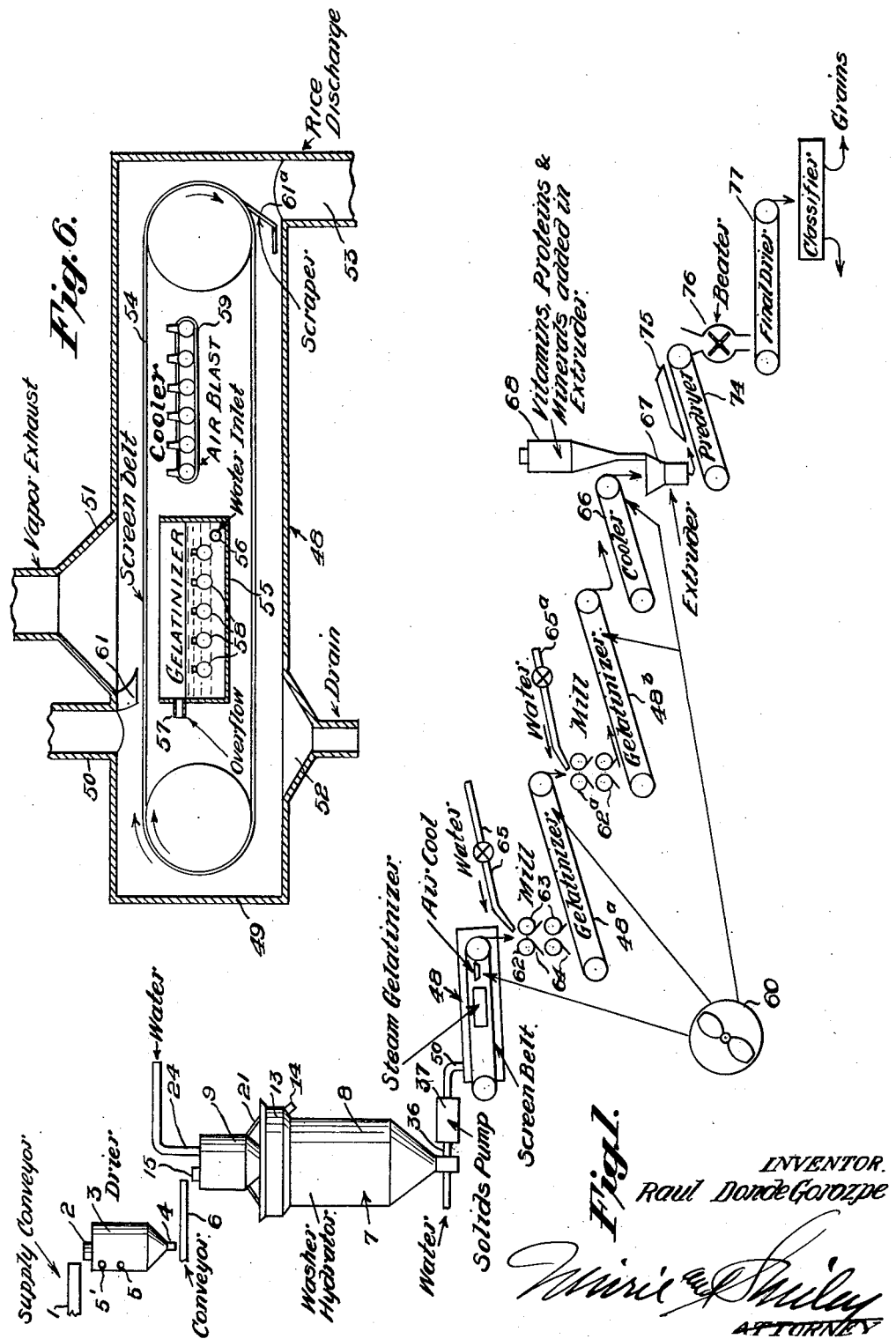

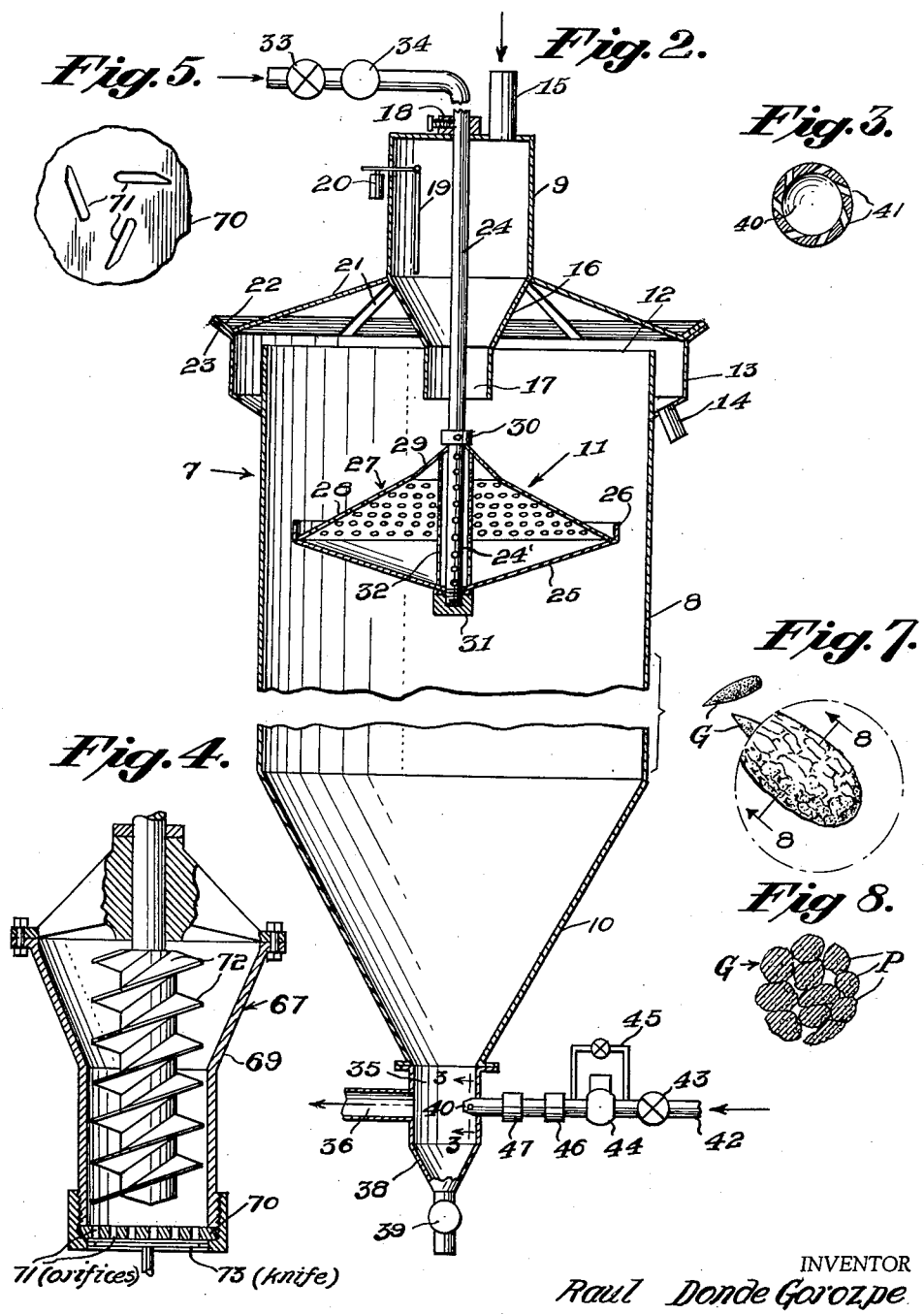

3,071,471
PROCESS FOR PREPARING A QUICK-COOKING RICE PRODUCT
Raul Donde Gorozpe, Calle Adolfo Prieto 420-2, Mexico City, Mexico
Filed Sept. 23, 1960, Ser. No. 58,064
7 Claims. (Cl. 99—80)

This invention relates to a method of and apparatus for preparing a quick-cooking rice product, and more particularly to the production of such a product from broken rice. The invention also relates to the rice product itself. This application is a continuation-in-part of my application Serial No. 680,646, filed August 28, 1957.

In the husking and milling of rice to produce white rice, a large proportion of the grains or kernels are broken. When the rice is subsequently graded, the broken grains are separated from the whole grains and the broken grades are used for livestock feed while the better whole grades are prepared for sale for table use. Furthermore, the lower quality whole grades, which include smaller, malformed and/or discolored grains are much less desirable, and have a much lower market price than the better grades of larger long pure white grains. As a result, these lower quality whole grades are also relegated to use in livestock feed or the like. Consequently, the better quality whole grades are relatively expensive, whereas, the broken grades and lower quality whole grades are quite inexpensive.

Having in mind the defects of the prior art rice products and methods of preparing them, it is the principal object of the present invention to provide a white rice product formed from lower quality grades of rice but which resembles, in appearance, quick-cooking whole rice.

Another object of the present invention is to provide a highly desirable white rice product formed from lower quality grades of rice.

Still another object of the present invention is to provide a process for producing a white, quick-cooking rice product from lower quality grades of rice.

Yet another object of the present invention is to provide a quick-cooking rice product at a price lower than that of the present precooked products by using a readily available, inexpensive raw material in a simple economical and continuous manufacturing process.

A further object of the invention is to provide a rice product whose porous structure enables a quick and complete penetration of the product by boiling water as used by the housewife in the process of reconstituting the product.

A still further object of the invention is to provide a very nutritious food enriched and with vitamins, minerals and protein and that when cooked and served at the table is identical in its appearance with ordinary or quick-cooking rice made from whole grains, but is more valuable as a food, with greater economy in price and time of cooking and fuel expense.

Briefly, the essence of the present invention resides in gelatinizing and grinding swelled rice, which is hydrated throughout, to reduce it to a very porous, fluffy, flaky material, each particle of which is non-homogeneous and formed by a multiplicity of gelatinized starch cells, and drying the gelatinized material to 10–14% moisture content, which is the normal in rice. The final product may be in the form of a meal for use in preparing a flour, in which event the particles of the gelatinized material are separated or ground after being dried. Alternatively, the gelatinized material may be formed in grains before drying, preferably by extruding the gelatinized particles in small rod-like strips and cutting the extruded strip to form individual grains.

In either case, the resulting product is a white quick-cooking product and in the latter case it is a grain resembling whole grain quick-cooking rice and is indistinguishable therefrom when prepared for table use. Improvements in the process to preserve substantially all of the original nutritive values of the rice and/or to expedite the process so that it may be continuous, comprise quickly drying the broken rice to cause it to crack or check to increase its absorptiveness, washing the checked rice with a minimum of agitation to avoid removal of the outer layers and their nutrients, and gelatinizing the particles throughout by any suitable method, advantageously by a thermal agent including wet steam, dry steam, hot water or boiling water, and the like, to preserve the nutrients, but I prefer to use wet steam for this purpose.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIGURE 1 is a diagrammatic layout of the apparatus employed in the process for producing a whole grain product;

FIGURE 2 is an enlarged diagrammatic cross-sectional view of the washer and hydrator;

FIGURE 3 is an enlarged fragmentary cross-sectional view of a water injection nozzle in the hydrator and taken on the line 3—3 of FIGURE 2;

FIGURE 4 is an enlarged cross-sectional view of the extruder;

FIGURE 5 is an enlarged fragmentary plan view of the exruder die;

FIGURE 6 is a diagrammatic cross-section view through the gelatinizing apparatus;

FIGURE 7 is a view of rice kernels formed by the present process, a portion of one kernel being highly magnified, and FIGURE 8, is a cross-sectional view of a rice kernel according to the invention and taken on line 8—8 of FIGURE 7.

The process hereinafter described is that which has been developed with respect to the varieties of rice commonly grown under dry cultivation and commercially available in Mexico and under average conditions with an ambient temperature of about 70° F. (20° C.) and 60% relative humidity. Tests have shown that the conditions of the various steps in the process will be varied from those stated in processing other varieties, such as those grown in the United States, or under wet cultivation, or under different atmospheric conditions. Regardless of varieties or conditions, however, the basic object of the invention is to produce a kernel that is gelatinized throughout and which resembles a high quality, large, white whole rice grain.

The essential steps include repeatedly gelatinizing and crushing the rice to provide small individual particles, each of which is gelatinized throughout, and extruding these particles to cause them to adhere together without forming a homogeneous mass or paste. To attain this objective, the particles must have a moisture content of about 35–45% and preferably of about 40–42% when extruded. A lesser moisture content of about 30% or less results in non-adherence of the particles, while a higher moisture content of about 50% or more results in a pasty mass. Accordingly, the moisture treatments hereinafter described may be varied according to conditions so that the product will arrive at the extrusion step with the desired 35–45% moisture content.

The general process, according to the invention, is applied to the rice after previously cleaning it by any conventional procedure, and comprises drying the broken and/or lower grades of rice to relatively rapidly reduce its moisture content and to cause it to check or develop cracks without breaking and without decomposing the contained starches. Normally, the rice has a moisture content of 10–14%, and this is reduced by the quick drying step by about 2–5%, which causes checking of the rice.

The drying step may be varied in accordance with atmospheric conditions. The rice is heated to a temperature above about 100° F. (37.8° C.), and preferably between about 122° F. (50° C.) and about 158° F. (70° C.) for a period between about 30 and 60 minutes, depending upon the temperature employed, the drying time being shortened at the higher temperatures. Thus, it has been found advantageous to employ a temperature of about 140° F. for a period of 30 minutes. This temperature is about the maximum permissible to bring about rapid drying and checking of the rice while at the same time avoiding changes in the constitution of the rice which might produce difficulties in subsequent gelatinization and cooking. The drying step is carried out by blowing heated air through the rice for the desired temperature and time for example through perforated tubes or similar means, or by infrared heating, to develop cracks or fissures in the rice. At 140° F. the moisture content is reduced quickly by about 3% from the original level, and this brings about the checking which enables the rice to absorb water more quickly and thoroughly in the later processing. A temperature as low as 104° F., for example, would effect the checking, but would require about 60 minutes drying time.

The dried checked rice is next subjected to the washing and hydrating steps. It is first washed to remove any foreign matter and to wet the broken grains. This washing is very gentle and quick to avoid removal of any of the surface layers and nutrients of the rice, employing water at a temperature below that of gelatinization. After washing, the wet rice is hydrated, this hydration being effected to cause complete permeation thereof and swelling, without gelatinization, of any portions of the rice. The cracks in the checked rice, especially broken rice, permit ready permeation of the water and the rice is hydrated for a period ranging from about 15 to 120 minutes with water at ambient temperature. At ambient temperature, it has been found that a minimum of about 30 minutes hydration is desirable to achieve a rise in moisture content of the rice to about 30–32%. Depending upon the water temperature and the type of rice being processed, the moisture of the rice is raised to a content of 25–40%, the rice swelling and absorbing the water evenly. If water with a temperature of 113° F. (45° C.) is employed, the moisture content reaches 38–40%, which represents a particularly advantageous level, and accordingly it is preferred to use water at this temperature. However, higher water temperatures than 113° F. are not advisable owing to the danger of premature gelatinization at the rice surfaces.

Following the hydration step, the rice carrying a large amount of unabsorbed surface water is sent to a dewatering device, such as a reel, centrifuge, an open mesh wire conveyor, or other suitable type of drainer. The water not absorbed by the rice but clinging to the surface thereof must be eliminated because in subsequent milling the rice may form a paste and not the desired small particles. The surface water is eliminated by forcing a current of air through the rice on the wire mesh conveyor, leaving a rice with about 30–32% moisture if hydration with water at ambient temperature was previously employed, or with about 38–40% moisture if hydration was carried out with water at 113° F. as previously described. Enrichment materials are added to the drained rice prior to the milling step.

In accordance with a preferred mode of operation of the process, the rice, deprived of surface water, is passed through a roller mill having either equal speed rollers, or differential speed rollers so as to produce a shearing action. The milling step produces clusters of round particles of rice ranging in size from about 1/64 inch to about 3/32 inch in diameter, which are very porous and adapted for gelatinization.

The swelled, hydrated, but ungelatinized rice, having a moisture content between about 30% and 40%, as described, is then subjected to gelatinization by means of wet steam or hot water, wet steam being preferred. The gelatinization of the rice may, in accordance with this invention, be carried out optionally in one, two, three or more stages, depending upon the conditions selected.

In accordance with a preferred method of the invention, the hydrated rice may be gelatinized in a single stage, to about 90–95% of complete gelatinization, by treatment with wet steam, at atmospheric pressure, at a temperature from about 194° F. (90° C.) to 212° F. (100° C.) for a period of about 20 to 90 seconds. The gelatinized rice may be cooled to about 104° F. (40° C.), and broken into lumps having a moisture content from about 30% to 45%. An extraordinarily rapid and complete gelatinization is promoted by employing as prior steps in the process, an initial drying step at 140° F. for a period of 30 minutes, and a hydration step to achieve a level of hydration of 38–40% moisture by treatment with water at a temperature of 113° F. for about 30 minutes, as desribed above.

Depending upon the type of product which is ultimately desired, the rice obtained in the single stage gelatinization may be further treated, in accordance wth the invention, to provide either a granular, meal-like product, or a whole grain rice.

If a granular product is to be manufactured the lumps from the first gelatinization are dried by hot air at a temperature between about 176° F. (80° C.) and about 284° F. (140° C.), the air being sent upward and downward through the rice at a velocity which reduces the moisture content to about 15–25%. The semi-dried material is then broken up on breaking rolls to a size of about 1/16 inch to 1/8 inch and fed to a rotary dryer where the particles are further broken up or separated and dried to a moisture content of about 10–14% by means of hot air at a temperature of about 176° F. (80° C.) to 248° F. (120° C.). The dried material is screened to the required particle size and the oversized particles ground in a roller mill and the product again screened. The screened rice cools to about 86° F. (30° C.) during processing and is sent to the cereal packing line.

Alternatively, and particularly where a whole grain product is desired, the rice may be gelatinized in a sequence of two stages, the first stage comprising partially gelatinizing the hydrated rice, preferably with wet steam, to at least about 30% of complete gelatinization, crushing the partially gelatinized rice to reduce it to small particles, and further gelatinizing the rice in a second stage to about 80–95% of complete gelatinization. Further, alternatively, the rice may be gelatinized in a sequence of three stages, the first stage comprising gelatinizing the hydrated rice partially to about 30–40% of complete gelatinization, crushing the partially gelatinized grains to reduce them to small particles, then further gelatinizing the rice in a second stage to about 50–70% of complete gelatinization, again milling to crush the rice to small particles, and then in a third and final stage gelatinizing the rice to 80–95% of complete gelatinization.

The single stage gelatinization, in combination with the preferred drying and hydration methods, represents a great improvement in processing and a large saving in time and in equipment. Moreover, it assures a shorter overall steaming time and avoids any danger of over-gelatinization which might make the rice paste or the cooked rice sticky.

The single stage method is preferably carried out with wet steam since this avoids removal of nutrients or the formation of a shell on the particles. Complete gelatinization is avoided because the porosity of the material is destroyed and the desired whiteness is lost, the material then having a translucent appearance. After gelatinization the rice may also be extruded, the extruded grains maintaining their porous structure, the rice being pressed sufficiently to not come apart during cooking.

Where a whole grain rice is to be produced, it may be desirable to employ two or three gelatinization stages. Thus, in accordance with one mode of operation, the gelatinized product from the first stage gelatinization, having a moisture content of 30–45%, is further cooled and also moistened if desired, by an air blast, for example, and fed to an extruder, which may be of the type disclosed in U.S. Patent 2,914,005. The extruder forms the rice into whole grains of the preferred size and shape and delivers them to a wire mesh conveyer forming a layer from ½ inch to 1 inch thick, which is subjected to a second gelatinization with wet steam at atmospheric pressure and at a temperature from about 194° F. (90° C.) to 212° F. (100° C.) for a period of about 20–90 seconds and 40–50% moisture. Alternatively, the extruded rice may be subjected to the second gelatinization by wet steam at atmospheric pressure and 90°–100° C. temperature for a period of 20–60 seconds, the moisture being raised to about 62% by either spraying water on the rice or by immersion in water for a period of from 1 to 5 minutes. The water temperature should be below that of gelatinization, namely 131° F. (55° C.). If desired, the grains, after this immersion or spraying with water, are drained of excess water, and are gelatinized a third time with wet steam at atmospheric pressure and temperature of 90°–100° C. for 20–90 seconds, whereby the whole grain rice will have a moisture content of not more than about 65%.

In both the two stage and three stage gelatinizations, the grains are preferably cooled to a temperature below about 55° C. (131° F.) by cold air blast or other suitable means, or to a temperature below that of gelatinization in order to inhibit further gelatinization. The grains are then pre-dried by hot air at a temperature of 80°–140° C. for about 4–8 minutes to a moisture content of about 25–30%, and then completely dried in a rotary dryer at a temperature of about 80°–120° C. for about 12–20 minutes, to obtain a product having about 10–14% moisture. The dried rice is classified and the oversized and undersized material is fed to a holding bin to be used further in granulated cereal manufacture. The whole grain rice of the desired size and thickness is cooled, screened to separate broken material or powder, and placed in storage bins for use in whole grain packing.

The gelatinized particles are enriched, if desired, by the addition of vitamins, proteins and/or minerals and then either dried to form a meal-like product or prior to drying, they are formed into grains resembling whole grain rice. In the latter case, the particles are extruded with the least pressure possible and with a minimum of kneading so as to preserve the porous structures of the particles but cause them to adhere together. The product is extruded in small rod-like strips of a size about equal to the longitudinal section of whole rice grains and these strips are cut in short lengths to form individual grains about equal in size too, but preferably slightly larger than, the better grades of whole rice grains.

To increase the resemblance to whole rice, the extruded strips may be elongate in section, preferably with one end curved and the other tapered, similar to whole rice, and cut perpendicularly of their length. As the extrusion causes a greater accumulation of the mass of material at the center portion, due to the elongated shape of the extrusion orifices, after the cutting the mass at the center expands to a greater degree than at the end portions so that the finished grain is somewhat oval and has a resemblance to a grain of polished rice.

The cut particles are predried rather rapidly to reduce the moisture content to about 20–25% and create a surface crust which prevents subsequent shrinking of the product. This predrying is effected for approximately 5 minutes at about 300° F. (148.9° C.). The predried rice is then agitated to separate any of the particles or formed grains that may be adhered together and this agitation also serves to smooth or round any sharp cut edges of the grains so that they more closely resemble whole rice. The grains are then finally dried for about 10 minutes at a maximum of 150° F. (65.6° C.) to reduce the moisture content to the usual 10–14%.

The resultant product is classified and packed for commercialization. The rice product so produced has excellent keeping properties in storage because of the steam sterilization during gelatinization; it has a very high nutritive value and improved flavor because very little of the natural nutritive value is lost during processing; it is substantially pure white throughout; it is a very quick-cooking rice product and cooks quicker than any other precooked rice now on the market; and when prepared for table use, it is practically indistinguishable from first grade large grain whole rice, except that the grains are desirably slightly larger, while its cost is only a fraction of that of precooked whole rice.

The process, according to the present invention, will now be described in detail with reference to the accompanying drawings, specifically FIGURE 1.

Broken rice, or lower grade whole grain rice, as obtained from the rice mills, is dry cleaned in the usual manner and the cleaned broken rice, with moisture content of 10–14%, is fed to a holding bin in which the rice level is controlled by limit switches, in known manner, and is deposited by a conveyor 1 into the inlet 2 of a drier 3 which comprises an upright bin through which warm air is blown into and through the rice, for example through perforated tubes. The drier may be provided with a hopper-like bottom with a discharge 4 at the lower end thereof and adjacent the upper end of the drier preferably are disposed a pair of vertically spaced limit switches 5 and 5' which are actuated by the rice and control the operation of the conveyor 1 in known manner so that a relatively constant quantity of rice is kept in the drier.

The temperature of the air blown through the rice is between about 100° F. (37.8° C.) and about 140° F. (60° C.) preferably the latter, but a temperature of 120° F. (48.9° C.) can be used, depending upon the time of exposure. The temperature should not be so high as to scorch the rice, and ordinarily should be such as to heat the rice to 50°–70° C. Usually, in continuous operation, the rice is in the drier for about 30–60 minutes, but this period can also be varied provided the moisture content of the rice is reduced, usually by about 2–5%, rapidly enough to cause the rice to check or crack. The cracks facilitate permeation of the grains by water in the subsequent hydration thereof. The heated dried rice is fed through the discharge 4 of the drier 3 to an elevator or air conveyor 6, which delivers the dried rice to the holding bin 9 of a washer-hydrator 7.

As best shown in FIGURE 2, the washer-hydrator 7 comprises an upright container 8 with a holding bin or inlet chamber 9 equipped with limit switches to control the rice level at the upper end, a hopper-like bottom 10 and a washing unit 11 within but adjacent the upper end and immediately below the inlet chamber 9. The container 8 is open at its top, its upper rim 12 forming an overflow that is surrounded by a gutter 13 having a drain discharge 14. The inlet chamber 9 comprises an inverted housing having an inlet 15 in its tip for receiving the dried rice from the conveyor 6, and a tapering bottom 16 converging to a discharge opening 17 below the top 12 of the container 8. Chamber 9 has a bore centrally in its top surrounded by a collar 18 having a set screw, and within the chamber 9 is mounted a pressure responsive operator 19 for actuating a micro-switch 20 which controls the operation of the conveyor 6. The inlet chamber 9 may be freely mounted on the container 8 by means of radial braces 21 extending to a ring 22 that nests in an inclined flange 23 surrounding the gutter 13.

The washer 11 is suspended on its water supply pipe 24 which extends upwardly through the collar 18 and is secured by the set screw at selected elevation relative to the inlet discharge 17. The washer 11 comprises a lower pan 25, having an upstanding peripheral flange 26, and an inverted conical tray 27, the peripheral edge of which is nested within the flange 26 and on the pan 25. The major portion 28 of the tray 27 is perforated but the central portion 29 of the tray is imperforate. The lower end portion 24' of the water pipe 24 is perforated for a distance substantially corresponding to the depth of the washer 11 which is fitted over this pipe portion 24' and located by a collar 30 fixed on the pipe 24 and a nut 31 and washer secured on the lower end of the pipe 24. To increase strength, the bottom pan 25 may be dished or conical and a perforated bracing sleeve 32 may be interposed between the pan 25 and the tray 27. The water supply pipe 24 is provided with a shut-off valve 33 and a pressure regulating valve 34.

The container bottom 10 converges to a discharge chamber 35 having a discharge opening 36 to a solids pump 37 (FIGURE 1), a sump 38 with a valved drain 39, and a water injection nozzle 40 preferably substantially opposite the opening 36 to assist in discharging the hydrated rice to the solids pump 37. The nozzle 40, as shown in FIGURE 3, has peripheral openings 41 at an angle to the radius, and said nozzle is connected to a water supply pipe 42 through a manual pressure regulating valve 43, an automatic shut-off valve 44 jointly controlled with the solids pump 37 so as to open only when the pump is in operation, a manually controlled bypass 45 around the automatic valve 44, and a check valve 46 and a strainer 47 to protect the automatic valve 44 from any matter that might back-flow through the nozzle 40.

When initially starting operation, the control valve 33 is opened to admit water through the pipe 24 until water completely fills the hydrator and overflows the edge 12, at which time water will also fill the lower portion of the inlet chamber 9 to the level in the container 8. To assist in filling the container, the manual pressure regulating valve 43 and bypass valve 45 are opened and when the container is filled, the bypass valve 45 is closed but the valve 43 is left open as the automatic valve 44 is also closed. The dried, checked rice is then fed through the inlet 15 into the chamber 9 and through the outlet 17 onto the washer tray 27. Light or oily grains that would otherwise tend to float are wetted by the water in the chamber 9 so that the majority of such grains sink from the outlet 17 to the tray 27. The rice flows or slides down the tray 27 and over the flange 26 into the bottom 10 of the container 8 until the container is filled with rice up to the outlet 17 and the chamber 9 is filled sufficiently to press the operator 19 to open the switch 20 and stop the conveyor 6.

The water supplied by the pipe 24 is discharged through the perforated portion 24' thereof and the surrounding sleeve 32 into the washer 11 and upwardly through the perforated portion 28 of the tray 27 to produce currents which gently agitate and wash the rice as it moves down the tray. The pressure of this inlet water is regulated by the valve 34 so that the incoming water will not tend to force the rice grains of heavier foreign matter upwardly toward the overflow rim 12 but will only cause the rice grains to float slightly so that the heavier matter will sink and be caught by the flange 26. The water temperature is below that of gelatinization, and the amount is regulated by valve 34 to be sufficient to cause a slight overflow and also to replace water drawn off with the hydrated rice. The rice entering the washer through outlet 17 spreads over the conical perforated washer 27 and on its way meets an upward current of either water or air fed in by pipe 24' or an auxiliary inlet (not shown) into washer 27, which bubbles up through the rice, but not enough to be carried to the overflow. Light foreign matter is caught up and carried away to the overflow. Heavier than rice foreign matter is caught in the brim 26 surrounding the conical perforated spray 27, and separated thereby. The rice continuously flows out of the hydrator through valve 39, which may contain a rotating vane to regulate the length of contact of water and rice. This contact time may be about 30–120 minutes. The perforations in the tray 27 are smaller than the broken rice grains so that they flow down the tray and over the flange 26 into the container 8. A narrow and peripheral portion of the tray 27 is imperforate to form with the flange 26 a trough for catching non-floating foreign matter, whereas floatable foreign matter is carried away by the overflow over the rim 12.

To insure movement of the rice down the tray 27, the perforate portion 28 thereof is disposed at an angle to the horizontal greater than the repose angle of rice in water, this angle preferably being between 28–35°, about 30° having been found to be best. The flange 26 is of sufficient height to catch foreign matter, such as sand, but precludes an appreciable accumulation of rice, a height of ¼" having been found highly efficient. The imperforate portion 29 of the tray 27 is slightly larger in diameter than the outlet 17 so as to baffle the incoming water from the outlet 17 and this portion 29 may be at a slightly greater angle than the perforate portion 28 to facilitate movement of the rice to the perforate portion 28.

The flow of the rice through the outlet 17 is regulated by the spacing of the tray 27 therefrom and this spacing may be varied by selective adjustment of the inlet pipe 24 in the collar 18. The pipe 24 may be connected to a water supply by a flexible connection to facilitate cleaning of the tray 27 and flange 26 by removing the pipe 24, chamber 9 and washer 11 as a unit from the container 8, this being enabled by the free nesting of the supporting ring 22 on the flange 23. The tray 27 may merely rest on the washer bottom 25 to permit separation, upon removal of the nut 31, for cleaning purposes.

After the container has been initially loaded and the rice has hydrated sufficiently, normally for 15 to 30 minutes, and has attained a moisture content of 25–40% the solids pump 37 is started to discharge the hydrated rice from the discharge chamber 35 of the container 8. The weight of the wet rice causes it to pack in the chamber 35. When the solids pump 37 is started, the automatic valve 44 is opened automatically and water is injected into the chamber 35 by the nozzle 40. The outwardly inclined openings 41 in the nozzle produce a swirling spray that stirs and fluidizes the packed rice to assist its discharge through the pump 37. In lieu of the pump 37, a screw or other type conveyor may be employed. It is to be noted that in the continuous processing of the rice, the pump 37 or other type conveyor is regulated to have a constant output less than the output of the conveyor 6 to maintain the hydrator 8 full at all times so that the rice is fully hydrated.

Following the hydration step, and prior to gelatinization, the rice may, as mentioned previously, be passed over a dewatering apparatus, such as a centrifuge or an open mesh wire conveyor (not shown) of conventional type, for removal of excess surface water by an air blast. The thus treated rice may also, if desired, be milled, as previously described, to produce small porous clusters of particles about ½ inch in diameter which are readily adapted to facilitate gelatinization, in a differential speed roller (not shown). Alternatively, the hydrated rice may be fed directly to the gelatinizer by a pump.

As shown in FIGURE 1, the pump 37 feeds the drained hydrated rice, enriched with enrichment additives during the milling, if desired, to a gelatinizer 48, the preferred form of which is shown in FIGURE 6. This gelatinizer comprises a housing 49 having in its top wall an inlet 50 adjacent one end and an exhaust hood 51 centrally of the inlet, and in its bottom wall a drain 52 substantially beneath the inlet and an outlet 53 at the opposite end. Longitudinally disposed within the housing 49 is an endless conveyor 54 of a close mesh wire screen and underlying the upper run and beneath the exhaust hood 51 is a water tank 55 having an inlet 56 and an overflow 57 overlying the drain 52. Within the tank 55 and below the water level established by the overflow 57 is arranged a plurality of steam injection pipes 58. Also underlying the upper run of the conveyor 54 and beyond the tank 55 is a cooler 59, preferably of the air-blast type, supplied by a fan 60, FIGURE 1. A spreader 61 may be disposed above the conveyor 54 adjacent the inlet 50, and a scraper 61a may be disposed adjacent the outlet 53 to remove any material adhering to the conveyor 54.

The pump 37 feeds the hydrated rice into the gelatinizer through inlet 50 onto conveyor 54 which comprises a wire mesh through which excess water drains through the conveyor and out the drain 52, the rice layer being deposited on the wire mesh to a thickness preferably from about ½ inch to 1 inch. The rice is spread evenly, without pressing, by the spreader 61 before passing over the tank 55. Steam or water may be used for gelatinization, which may be carried out in one, two or three stages, as described in detail previously. Where steam is used, wet steam at atmospheric pressure and a temperature between about 90°–100° C. is preferred. Steam from the pipes 58 passes up through the water in the tank 55 producing wet or moist steam which then passes up through the conveyor carried rice and out through the exhaust 51. Under humid or other conditions, the water may be eliminated from the tank 55 and dry steam used for the gelatinization. The steam during a period of about 20–90 seconds wholly or partially gelatinizes the rice, the step being controlled and stopped by cooling to about 40° C. by a cool blast of air as the rice passes over the cooler 59. The moisture content of the rice is raised about 2% by partial gelatinization.

The layer of product on the belt should have a depth of from ½″ to 1″ for fast, continuous operation with good gelatinization. The time of steaming is preferably from 15–30 seconds according to the degree of gelatinization desired, and the temperature of the product is raised to about 200° F. (93.3° C.). Gelatinization by steam is preferred over the use of boiling water or other types of heat. Steam does not remove any of the nutrients from the rice as does boiling water, nor does it require the addition of moisture to prevent the formation of a shell on the surfaces of the particles nor risk scorching and discoloring the particles as does dry heat. Steam has the advantage of retaining the nutrients, improving the color by whitening the resulting product, sterilizing the material and more rapidly gelatinizing the rice throughout.

The gelatinized rice is scraped off the conveyor and discharged through the outlet 53, broken into lumps ½ inch to 1 inch in diameter and passed to a mill 62, preferably a roller mill with smooth rollers 63 driven at different peripheral speeds to cause a slight shearing action. In the mill, the rice is reduced or crushed to small particles, preferably of about 1/64 of an inch in diameter, and, because the rice is hydrated and partially gelatinated, there are no fines. As the particles are moist, they more or less tend to cluster loosely together in the form of small balls.

The rollers 63 may be provided with scrapers 64 to remove any particles tending to adhere to their surfaces. The ball-like clusters of the particles are very porous, fluffy, flaky material and during this crushing any desired water-soluble flavoring additives may be incorporated to enrich the product. If necesary, the rollers 63 may be surface wetted with a thin film of moisture from a water inlet 65, this moisture carrying the flavorings, if desired, and being incorporated with the partially gelatinized material to raise the moisture content about 1%. If a granular product is to be produced the lumps previously mentioned may be predried in a conveyor dryer with hot air at a temperature of 80°–140° C., the hot air being sent up and down through the rice at a velocity sufficient to remove the material and permit the moisture to drop to 15–25%. The semidried material is then broken up by breaking rolls to a size of 1/16 inch to ⅛ inch and fed to a rotating dryer where the particles are further broken up or separated and dried to a moisture content of 10–14% by hot air at a temperature of 80°–120° C. The dried material is screened to required size, oversized particles being reground in a roller mill. The product is cooled to 30° C. and packed.

If a whole grain product is desired the gelatinized mass from the first gelatinization step having a moisture content of 30–45% is further cooled and also moistened if necessary, by means of an air blast, and fed into an extruder to form whole rice grains of the desired size and shape. These are delivered to a wire mesh conveyor to form a layer ½ inch to 1 inch thick forming the feed for the second stage gelatinization.

Where the gelatinization is conducted in two, three or more stages, the crushed partially gelatinized particles from the mill 62 may be fed directly to a second gelatinizer 48a, which may be identical in structure and operation with gelatinizer 48, and then passed through a second mill 62a, which may be identical with the mill 62, and have a water supply 65a. This sectiond gelatinization step may be for a period of 20–90 seconds, but preferably 15–30 seconds and will again increase the moisture content by about 2% and if moisture is supplied to the mill 62a about 1% moisture is added. For certain products, a second gelatinization stage may be sufficient. However, where a third gelatinization stage is employed, the particles from the mill 62a are fed to another gelatinizer 48b, also identical to the gelatinizer 48, and subjected to a third gelatinization for 20–90 seconds, or preferably 15–30 seconds to effect about 80–95% gelatinization of the rice particles. From the last gelatinizer, the particles are fed to a cooler 66, preferably comprising an endless wire conveyor and employing forced draft, and the temperature reduced to about 40° C. The coolers 59 in the gelatinizers 48, 48a and 48b and the cooler 66 may all be supplied by the fan 60. Other process variations have been described previously.

At this stage, the gelatinized particles may be subjected to further alternative treatments depending upon the end product desired. The gelatinized particles may be molded or otherwise formed into grains about the size of whole grain rice and then dried to provide a product having the appearance of first quality white rice. As large white rice is preferred, the formed grains are preferably slightly larger by about 15–20% than the first quality whole grain rice. Conversely, the gelatinized particles may be dried, any adhering particles separated or milled to produce a flour and/or meal-like product, for use in making cream of rice. The grains are preferably formed by extruding the gelatinized particles and the cooler 66 preferably discharges to an extruder 67 into which vitamins, proteins and/or minerals, preferably in powder form, may be added from a bin 68 to the mass of particles and mixed therewith by the kneading action of the extruder.

The extruder 67, as shown in FIGURE 3, is somewhat similar to those used in spaghetti production, and comprises an open-topped container 69, having a bottom die 70, with extruding orifices 71, and a screw 72 within the container 69 for feeding the gelatinized particles to the die 70 and forcing them through the orifices 71. A rotary knife assembly 73 is disposed adjacent the outer face of the die 70 for cutting the extruded material into short lengths. The screw 72 is revolved slowly and is as short as possible to avoid excessive kneading while providing sufficient pressure to force the gelatinized particles through the orifices 71. The pressure is just sufficient to cause the particles to adhere together without meshing them into a paste. Preferably, as shown in FIGURE 5, the orifices 71 are elongate in cross-section with one rounded end and one tapered end and of a size about equal to the longitudinal section of whole rice grains.

The extruded grains are fed to a predrier 74, preferably comprising an endless wire screen conveyor, the upper run of which passes over a heater, such as a hot air outlet, and may be surmounted by a hood 75. Infra red lamps or equivalent devices may be mounted in the hood 75 either to supplement or replace the heater. The extruded grains are dropped freely from the extruder 67 onto the drier conveyor which tends to separate any grains that might be adhered together. The grains are dried in the predrier 74 for a period of about 5 minutes at a temperature of about 250–300° F. (121°–148.9° C.). This lowers the moisture content of the grains to about 20–25% and increases their porosity with a slight expansion but without puffing or scorching.

As the grains are discharged from the predrier 74, preferably they are fed to a beater 76 of the rotary type which causes separation of any grains which are adhered together and this agitation also serves to smooth or round the cut edges of the grains so that their resemblance to whole grain rice is increased. From the beater 76, the grains are fed to a final drier 77 where their moisture content is reduced to the normal 10–14%. The grains are treated in the final drier 77 for about 5–10 minutes at a temperature not greater than 150° F. (54.4° C.) to prevent formation of a crust by surface gelatinization. The rice product, with the normal 10–14% moisture content, is then classified and packed in the usual manner.

The resulting grain product is shown in FIGURE 7, wherein it will be seen that the grains G are somewhat oval, rounded at one end and tapered at the other, and in appearance have a strong resemblance to large whole grain rice of the highest quality. Instead of being a homogeneous mass or body, however, these grains G consist of a large number of minute particles P adhered together but having air spaces and passages therebetween, as shown in FIGURE 8. This structure of the grains has the advantage that each particle has been gelatinized throughout so that the entire grain is likewise gelatinized throughout, the particles separated by air spaces refract light so that the grains appear white rather than the translucent gray of ordinary precooked rice, and the air spaces and passages enable extremely rapid re-hydration so that preparation for table use is quicker than with ordinary precooked rice.

In using the product formed in accordance with the invention, it is only necessary to cover the grain with boiling water, to which salt has been added, for about 2 minutes, and drain and place in a vaporizer for about 3 minutes to form a well cooked, rather hard, separate grain. By varying the amount of water, length of soaking and vaporizing, a more or less soft rice may be obtained. The rice as served has an identical appearance to first quality regular or quick-cooking whole grain rice now on the market.

Products according to the invention have greater value as a food and are more economical in price with the added advantages of economy in time and fuel in their preparation for table use. Only physical processes are used in treating the rice and foreign substances, with the exception of desired additives for enrichment, are not employed. The crushing of the hydrated, swelled, partially gelatinized rice eliminates loss through fines and enables more rapid and complete gelatinization. Also crushing at this stage avoids the subsequent formation of a paste that would result in a hard skinned product which would inhibit quick re-hydration for table use. The gelatinization of small particles of rice instead of the whole grain provides a highly porous product that is quick-cooking to a degree not found in ordinary whole grain rice and produces a more digestible product which is uniformly white.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A process for preparing a quick-cooking rice product which comprises hydrating rice to raise its moisture content to about 25–40% to cause complete permeation thereof and swelling of the rice without gelatinization, partially gelatinizing the hydrated rice in a first stage employing wet steam to about 30–40% of complete gelatinization, said gelatinized rice having a moisture content of about 30–45%, extruding said partially gelatinized rice to form a layer ½ to 1 inch thick, further gelatinizing said rice layer with wet steam to about 80–95% of complete gelatinization, the rice at this stage having from 40–50% moisture, and drying the gelatinized rice to reduce the moisture content to about 10–14% and to provide a quick-cooking rice product which has retained substantially all of the original nutrients.

2. A process for preparing a quick-cooking rice product which comprises hydrating rice to raise its moisture content to about 25–40% to cause complete permeation thereof and swelling of the rice without gelatinization, milling the rice to produce round porous particles ranging in size from about 1/64 to about 3/32 inch in diameter, gelatinizing the rice in a single stage to about 90–95% of complete gelatinization, extruding said gelatinized rice to form rod-like strips, cutting said strips into short lengths to form individual rice grains, and drying the rice grains to reduce the moisture content to about 10–14% and to provide a quick-cooking rice which has retained substantially all of the original nutrients.

3. The process of claim 2 in which the rice is checked by reducing its moisture content to about 2–5% by quick drying prior to the hydrating step.

4. A process for preparing a quick-cooking rice product which comprises hydrating rice to raise its moisture content to about 25–40% to cause complete permeation thereof and swelling of the rice without gelatinization, partially gelatinizing the hydrated rice in a first stage to about 30–40% of complete gelatinization, said gelatinized rice having a moisture content of about 30–45%, extruding said partially gelatinized rice to form a layer ½ to 1 inch thick, further gelatinizing said rice layer to about 80–95% of complete gelatinization, the rice at this stage having from 40–50% moisture, and drying the gelatinized rice to reduce the moisture content to about 10–14% and to provide a quick-cooking rice product which has retained substantially all of the original nutrients.

5. The process of claim 4 in which the rice is checked by reducing its moisture content to about 2–5% by quick drying prior to the hydrating step.

6. Process for preparing a quick-cooking rice product which comprises hydrating rice to raise its moisture content to about 25–40% to cause complete permeation thereof and swelling of the rice without gelatinization, partially gelatinizing the hydrated rice in a first stage to about 30–40% of complete gelatinization, said gelatinized rice having a moisture content of about 30–45%, extruding said partially gelatinized rice to form a layer ½ to 1 inch thick, further gelatinizing said rice layer in a second gelatinization stage to about 50–70% of complete gelatinization, the rice at this stage having from 40–50% moisture, raising the moisture content to about 62%, and in a third gelatinization stage, gelatinizing the rice to about 80–95% of complete gelatinization, and drying the gelatinized rice to reduce the moisture content to about 10–14% and to provide a quick-cooking rice product which has retained substantially all of the original nutrients.

7. The process of claim 6 in which the rice is checked by reducing its moisture content to about 2–5% by quick drying prior to the hydrating step.

References Cited in the file of this patent

UNITED STATES PATENTS

| | | |
|---|---|---|
| Re. 15,522 | Saint | Jan. 9, 1923 |
| 312,265 | Gent | Feb. 17, 1885 |
| 1,226,642 | Demovitch | May 22, 1917 |
| 1,399,920 | Baumgartner | Dec. 13, 1921 |
| 1,945,946 | McKay | Feb. 6, 1934 |
| 2,200,192 | Syse | May 7, 1940 |
| 2,213,623 | Choppin et al. | Sept. 3, 1940 |
| 2,437,460 | Francisci | Mar. 9, 1948 |
| 2,498,573 | Ozai-Durrani | Feb. 21, 1950 |
| 2,571,555 | Fernandes | Oct. 16, 1951 |
| 2,621,126 | Moller | Dec. 9, 1952 |
| 2,638,837 | Talmey et al. | May 19, 1953 |
| 2,696,157 | Campbell et al. | Dec. 7, 1954 |
| 2,937,946 | Ozai-Durrani | May 24, 1960 |

FOREIGN PATENTS

| | | |
|---|---|---|
| 401,555 | Great Britain | Nov. 16, 1933 |
| 719,870 | Great Britain | Dec. 8, 1954 |
| 9,493 | Great Britain | of 1900 |